United States Patent
He et al.

(10) Patent No.: US 11,657,322 B2
(45) Date of Patent: May 23, 2023

(54) METHOD AND SYSTEM FOR SCALABLE MULTI-TASK LEARNING WITH CONVEX CLUSTERING

(71) Applicant: NEC Laboratories Europe GmbH, Heidelberg (DE)

(72) Inventors: Xiao He, Heidelberg (DE); Francesco Alesiani, Heidelberg (DE); Ammar Shaker, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 951 days.

(21) Appl. No.: 16/414,812

(22) Filed: May 17, 2019

(65) Prior Publication Data

US 2020/0074341 A1    Mar. 5, 2020

Related U.S. Application Data

(60) Provisional application No. 62/724,704, filed on Aug. 30, 2018.

(51) Int. Cl.
*G06N 20/00* (2019.01)
*G06F 17/11* (2006.01)

(52) U.S. Cl.
CPC ............. *G06N 20/00* (2019.01); *G06F 17/11* (2013.01)

(58) Field of Classification Search
CPC ........ G06F 17/11; G06N 20/20; G06N 5/003; G06N 3/084; G06N 3/0454; G06N 3/08; G06N 20/10; G06K 9/6267; G06K 9/6256; G06K 9/627; G06K 9/6273; G06K 9/6277; G06K 9/628; G06T 7/143; G06T 7/0012;

(Continued)

(56) References Cited

U.S. PATENT DOCUMENTS 10,055,685 B1 * 8/2018 Arel ........................ G06N 20/00
10,162,794 B1 * 12/2018 Arel ..................... G06N 3/0445

(Continued)

OTHER PUBLICATIONS

Xiao He, L. Moreira-Matias: "Robust continuous co-clustering", arxiv.org, Cornell University Library, 201 Olin Library Cornell University Ithaca, NY 14853, Feb. 14, 2018 (Feb. 14, 2018), XP080856653.

(Continued)

*Primary Examiner* — Mouloucoulaye Inoussa
(74) *Attorney, Agent, or Firm* — Leydig, Volt & Mayer, Ltd.

(57) ABSTRACT

A method for scalable multi-task learning with convex clustering includes: extracting features from a dataset of a plurality of tasks; generating a graph from the extracted features, nodes of the graph representing linear learning models, each of the linear learning models being for one of the tasks; constraining the graph using convex clustering to generate a convex cluster constrained graph; and obtaining a global solution by minimizing a graph variable loss function, the minimizing the graph variable loss function comprising: introducing auxiliary variables for each connection between nodes in the convex cluster constrained graph; iteratively performing the following operations until convergence: updating the linear learning models by solving a sparse linear system; and updating the auxiliary variables by solving an equation having the auxiliary variables each be proportional to a vector norm for their respective nodes.

15 Claims, 4 Drawing Sheets

(58) Field of Classification Search
CPC ........ G06T 7/11; G06T 11/006; G06T 11/003; G06T 7/0014; G06V 10/267; G06V 10/82; G06V 20/698; G06V 10/454; G06V 20/695; G06V 10/25; G06V 10/462; H04W 16/14; H04W 24/10; G16H 50/20; G16H 30/40
USPC .............................................. 706/12, 26, 15
See application file for complete search history.

(56) References Cited

U.S. PATENT DOCUMENTS

| | | | |
|---|---|---|---|
| 10,162,860 B2* | 12/2018 | Gaza | G06F 16/24575 |
| 10,929,762 B1* | 2/2021 | Chen | G06N 5/04 |
| 11,120,361 B1* | 9/2021 | Januschowski | G06N 3/084 |
| 2002/0091655 A1* | 7/2002 | Agrafiotis | G06N 20/00 706/26 |
| 2007/0217676 A1* | 9/2007 | Grauman | G06K 9/6269 382/190 |
| 2010/0111396 A1* | 5/2010 | Boucheron | G06V 10/771 382/133 |
| 2010/0299303 A1* | 11/2010 | Horster | G06F 16/435 707/E17.014 |
| 2011/0299789 A1* | 12/2011 | Lin | G06V 10/464 382/238 |
| 2012/0191640 A1* | 7/2012 | Ebadollahi | G06N 20/00 706/53 |
| 2012/0330958 A1* | 12/2012 | Xu | G06K 9/6249 707/738 |
| 2013/0151441 A1 | 6/2013 | Archambeau et al. | |
| 2013/0208977 A1* | 8/2013 | Jia | G06K 9/6256 382/159 |
| 2013/0310093 A1* | 11/2013 | Giannakis | H04W 24/02 455/501 |
| 2014/0211644 A1* | 7/2014 | Giannakis | H04W 16/14 370/252 |
| 2015/0262083 A1* | 9/2015 | Xu | G06N 20/10 706/12 |
| 2015/0293976 A1* | 10/2015 | Guo | G06F 16/9535 707/706 |
| 2016/0034810 A1* | 2/2016 | Hershey | G06N 3/0436 706/22 |
| 2016/0042296 A1* | 2/2016 | Shan | G06F 16/9535 706/11 |
| 2016/0343146 A1* | 11/2016 | Brown | G06V 10/469 |
| 2017/0068888 A1* | 3/2017 | Chung | G06N 3/0454 |
| 2017/0083623 A1* | 3/2017 | Habibian | G06V 10/764 |
| 2017/0109322 A1* | 4/2017 | McMahan | G06N 20/00 |
| 2017/0116481 A1* | 4/2017 | Chen | G06V 10/56 |
| 2017/0123028 A1* | 5/2017 | Hammer | G06K 9/6256 |
| 2017/0132769 A1* | 5/2017 | Barron | G06T 5/50 |
| 2017/0300830 A1* | 10/2017 | Kadav | G06F 15/17312 |
| 2017/0372226 A1* | 12/2017 | Costa | G06F 21/60 |
| 2018/0032858 A1* | 2/2018 | Lucey | G06F 16/9027 |
| 2018/0075315 A1* | 3/2018 | Gu | G06T 7/0002 |
| 2018/0114056 A1* | 4/2018 | Wang | G06V 40/172 |
| 2018/0165554 A1* | 6/2018 | Zhang | G06K 9/6256 |
| 2018/0232883 A1* | 8/2018 | Sethi | G06V 10/764 |
| 2018/0260951 A1* | 9/2018 | Yang | A61B 6/5217 |
| 2018/0300317 A1* | 10/2018 | Bradbury | G06F 40/211 |
| 2018/0328967 A1* | 11/2018 | Lange | G01R 31/2825 |
| 2018/0336472 A1* | 11/2018 | Ravi | G06F 17/16 |
| 2019/0150764 A1* | 5/2019 | Arnold | A61B 5/0263 |
| 2019/0156206 A1* | 5/2019 | Graham | G06N 3/0454 |
| 2019/0179858 A1* | 6/2019 | Douze | G06F 16/90335 |
| 2019/0200893 A1* | 7/2019 | Grouchy | G06T 3/4007 |
| 2019/0340710 A1* | 11/2019 | Xue | G06Q 10/02 |
| 2019/0378037 A1* | 12/2019 | Kale | G06N 20/00 |
| 2020/0167930 A1* | 5/2020 | Wang | G06T 7/0012 |
| 2020/0193552 A1* | 6/2020 | Turkelson | G06V 10/454 |
| 2020/0219008 A1* | 7/2020 | Franceschi | G06N 7/005 |
| 2020/0327404 A1* | 10/2020 | Miotto | G06N 3/0481 |
| 2020/0388029 A1* | 12/2020 | Saltz | G06T 7/143 |
| 2021/0089841 A1* | 3/2021 | Mithun | G06T 7/97 |

OTHER PUBLICATIONS

L. Han, Y. Zhang: "Learning multi-level task groups in multi-task learning", Proceedings of the 29$^{th}$ AAAI Conference ON Artificial Intelligence (AAAI '15), Jan. 25, 2015 (Jan. 25, 2015), pp. 2638-2644, XP055663309.

J. Zhou et al: "Multi-task learning via structural regularization", MALSAR user's manual version 1.1, Dec. 18, 2012 (Dec. 18, 2012), XP055663314.

Yu Zhang, et al., "A Survey on Multi-Task Learning", arXiv:1707.08114v2 [csLG], Jul. 27, 2018, pp. 1-20.

Jiayu Zhou, et al., "Clustered Multi-Task Learning Via Alternating Structure Optimization", Adv Neural Inf Process Syst, Oct. 17, 2014, pp. 1-9.

Laurent Jacob, et al., "Clustered Multi-Task Learning: a Convex Formulation", arXiv:0809.2085v1 [csLG], Sep. 11, 2008, pp. 1-14.

* cited by examiner

METHOD AND SYSTEM FOR SCALABLE MULTI-TASK LEARNING WITH CONVEX CLUSTERING

CROSS-REFERENCE TO RELATED APPLICATION

Priority is claimed to U.S. Provisional Patent Application No. 62/724,704, filed on Aug. 30, 2018, the entire disclosure of which is hereby incorporated by reference herein.

FIELD

The present invention relates to a method and system for scalable multi-task learning with convex clustering.

BACKGROUND

Multi-task learning (MTL) is a branch of machine learning that aims at exploiting the correlation among tasks. To this end, the learning of different tasks is performed jointly (with a better model built for each task). A benefit of multi-task learning is that by learning task relationships, knowledge can be transferred from an information-rich task to information-poor tasks so that the overall generalization error may be reduced. Various multi-task learning algorithms have been proposed. See, e.g., Zhang and Yang, "A Survey on Multi-Task Learning," arXiv:1707.08114v2 (Jul. 27, 2018) (providing a comprehensive survey on state-of-the-art methods); see also, U.S. Patent Application Publication No. 2013/0151441, entitled "Multi-task learning using Bayesian model with enforced sparsity and leveraging of task correlations" (the entire contents of each of which are hereby incorporated by reference herein).

SUMMARY

An embodiment of the present invention provides a method for scalable multi-task learning with convex clustering that includes: extracting features from a dataset of a plurality of tasks; generating a graph from the extracted features, nodes of the graph representing linear learning models, each of the linear learning models being for one of the tasks; constraining the graph using convex clustering to generate a convex cluster constrained graph; and obtaining a global solution by minimizing a graph variable loss function, the minimizing the graph variable loss function including: introducing auxiliary variables for each connection between nodes in the convex cluster constrained graph; iteratively performing the following operations until convergence: updating the linear learning models by solving a sparse linear system; and updating the auxiliary variables by solving an equation having the auxiliary variables each be proportional to a vector norm for their respective nodes.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
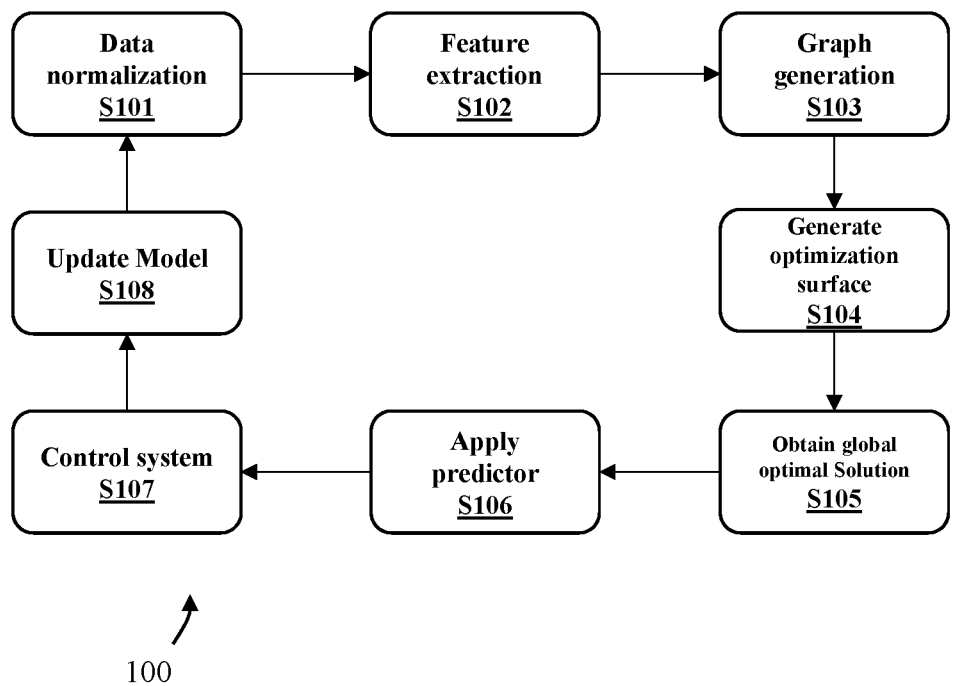
FIG. 1 illustrates a flow diagram of a multi-task regression method according to an embodiment of the present invention.

The present inventors have recognized that there is a problem of efficiently learning multiple regression tasks, where the tasks possess some intrinsic correlation that is not evident or explicitly defined. One example is multiple time series prediction, where each time series possess attributes. Consider, for example, the price or the demand of multiple products. Further, consider also a multitude of stores, as in the case of a single country or multinational scenario. Many factors affect the local behavior of the demand or the price. For example, the weather can play a role, but its effect may be completely different and correlated with other aspects. In addition, the potential number of tasks can be huge. For instance, there can be thousands of products in a retail store, and thousands of stores over the country for a retail chain. In total, there can be millions regression tasks.

The present inventors have also recognized that an ideal multi-task regression method should: 1) be able to discover correlation between tasks and exploit their existence to improve the prediction performance; 2) be efficient regarding training time; and 3) have a linear runtime with regard to the number of tasks. The state-of-the-art (SoA) multi-task learning methods, however, fail to provide all of above mentioned features. For example, simple SoA methods cannot explore the relation between tasks, while complex SoA methods are expensive to train and do not scale to large number of tasks.

Embodiments of the present invention provide a robust and scalable multi-task learning method and system. The multi-task learning method and system of the present invention optimally learn the tasks' relationships based on the convex clustering of their prediction models. Embodiments outperform previously proposed methods in terms of accuracy and performance, and also scale linearly in the number of tasks. Embodiments can be applied, for example, for multiple time series prediction with an extensive number of time series (tasks). Thus, embodiments of the present invention can provide the three ideal features of multi-task regression methods discussed above, amounting to an improvement in the field of machine learning.

In addition, as shown below, embodiments of the present invention outperform other approaches, particularly in the case of large datasets having many tasks (with each task possessing a small number of instances within the dataset) where the SoA methods hit performance issues (that are not present in embodiments of the present invention). One aspect of embodiments of the present invention that enables this improved performance is that embodiments scale linearly with the number of tasks and can deal with regression problems on a large dataset. Further, due to their linear time-scalability, the methods of embodiments can be used easily in an iterative hyperparameter selection and frequent retraining scenarios.

In embodiments discussed herein, a linear model is assumed. However, this assumption, as is evident from the results and the applications, is not restrictive, especially when dealing with a short time series, the prediction accuracy of more complex methods is worse (as compared to the present invention) due to the overfitting on small datasets.

In order to solve a multi-task learning problem when the number of tasks is large, embodiments of the present invention combine two measures to balance between the training error and the generalization performance by introducing a regularization term that captures the correlation among tasks in the form of a graph. In particular, embodiments of the present invention integrates with convex clustering on a graph of learned linear models and solves the underlying convex problem with a novel optimization method that iteratively solves a structured linear system.

By utilizing the clustering of regression tasks by their predictability in multi-task learning and employing convex functions, embodiments of the present invention achieve accuracy that is proportional to the square of the prediction error, while also having the correlation capturing function be proportional to the Euclidian distance of the predictors.

In addition, because embodiments of the present invention implement a method having functions formulated to lead to a sparse linear system (i.e., two structured positive semi-definite matrices having a sparse block diagonal component and a sparse Laplacian component), the functions can be empirically solved in linear-time regarding the number of tasks by a Combinatory Multi-Grid (CMG) method. See, e.g., Ioannis et al., "Combinatorial preconditioners and multilevel solvers for problems in computer vision and image processing," Computer Vision and Understanding 115(12), pp. 1636-1646 (2011) (discussing the CMG method) (the entire contents of which is hereby incorporated by reference herein).

Embodiments of the present invention therefore provide a system and method having unique advantages for multi-task regression in terms of improved: accuracy; computational efficiency; computational and memory scalability; and tuning as compared to the SoA.

An embodiment of the present invention provides a method for scalable multi-task learning with convex clustering, the method including: extracting a feature from task data; generating a graph from the extracted features; generating an optimization surface based on the generated graph using convex clustering; and obtaining a global optimal solution by iteratively solving a structured linear solution. Embodiments may also use the learned model for making predictions. The method may further include preprocessing the task data before extracting the feature data. In an embodiment, the data preprocessing may include removing missing values and/or normalization.

According to an embodiment, a method for scalable multi-task learning with convex clustering is provided that includes: extracting features from a dataset of a plurality of tasks; generating a graph from the extracted features, nodes of the graph representing linear learning models, each of the linear learning models being for one of the tasks; constraining the graph using convex clustering to generate a convex cluster constrained graph; and obtaining a global solution by minimizing a graph variable loss function. Minimizing the graph variable loss function includes: introducing auxiliary variables for each connection between nodes in the convex cluster constrained graph; iteratively performing the following operations until convergence: updating the linear learning models by solving a sparse linear system; and updating the auxiliary variables by solving an equation having the auxiliary variables each be proportional to a vector norm for their respective nodes. In an embodiment, the auxiliary variables are proportional to the inverse of an L2 norm for their respective nodes.

The graph variable loss function with introduced auxiliary variables can be expressed as:

$$\min_{W,L} \frac{1}{2} \sum_{t=1}^{T} \|W_t^T X_t - y_t\|_2^2 + \frac{\lambda}{2} \sum_{i,j \in G} \left( l_{i,j} \|W_i - W_j\|_2^2 + \frac{1}{4} l_{i,j}^{-1} \right).$$

Here, $W_i$ is a linear learning model of the linear learning models for task $T_i$ of the tasks, $\lambda$ is a weighting factor, G is the convex cluster constrained graph, $X_i$ is a vector of an input of the task $T_i$, $y_i$ is a vector of an input for the task $T_i$, $l_{i,j}$ is an auxiliary variable of the auxiliary variables for one of the connections between the nodes, $\|W_i - W_j\|_2$ is the vector norm, which is an L2 norm, for the one of the connections between the nodes, L is a set containing the auxiliary variables, and W is a set of the linear learning models.

According to an embodiment, the sparse linear system can be expressed as: (A+B)V=C. Here, $A = (\lambda \Sigma_{i,j \in G} l_{i,j}(e_i - e_j)(e_i - e_j)^T) \otimes I_P$, $B = XX^T$, $C = XY^T$, $e_i \in \mathbb{R}^T$ is an indicator vector with an ith element set to 1 and other elements set to 0, and $I_P$ is an identity matrix of size P. Also, X is a block diagonal matrix containing the vector of the input for each of the tasks, Y is a row vector containing the vector the input for each of the tasks, and V is a column vector containing the linear learning models of the tasks. The solving of the sparse linear system includes executing a combinatorial multigrid algorithm.

In an embodiment, the auxiliary variables are updated by solving the following equation for each of the auxiliary variables:

$$l_{i,j} = \frac{1}{2\|W_i - W_j\|_2}.$$

According to an embodiment, obtaining the global solution generates a multi-task predictor.

The method may further include using the multi-task predictor to make a prediction, and executing a control operation on a system associated with the tasks based on the prediction.

The method may further include updating the multi-task predictor based on receiving new data points.

The method may further include preprocessing the task dataset before extracting the features. The data preprocessing may include removing missing values and/or normalizing the task data.

According to an embodiment, extracting the features from the task dataset includes performing an auto regressive function on the task dataset.

According to an embodiment, the generating the graph from the extracted features includes learning the linear learning model for each of the tasks from the extracted features that correspond to the respective task.

The learned linear model for each task can be represented by a weight vector. The graph can be a k-nearest neighbor graph in Euclidean space.

According to another embodiment, a multi-task learning system is provided that includes a processor coupled to a non-transitory storage memory containing instructions, which when executed by the processor, cause the multi-task learning system to: extract features from a dataset of a plurality of tasks; generate a graph from the extracted features, nodes of the graph representing linear learning models, each of the linear learning models being for one of the tasks; constrain the graph using convex clustering to generate a convex cluster constrained graph; and obtain a global solution by minimizing a graph variable loss function. Minimizing the graph variable loss function includes: introducing auxiliary variables for each connection between nodes in the convex cluster constrained graph; iteratively performing the following operations until convergence: updating the linear learning models by solving a sparse linear system; and updating the auxiliary variables by solving an equation having the auxiliary variables each be proportional to a vector norm for their respective nodes.

According to another embodiment, a non-transitory processor-readable storage medium is provided that stores instructions that upon execution cause a multi-task learning system to: extract features from a dataset of a plurality of tasks; generate a graph from the extracted features, nodes of the graph representing linear learning models, each of the linear learning models being for one of the tasks; constrain the graph using convex clustering to generate a convex cluster constrained graph; and obtain a global solution by minimizing a graph variable loss function. The minimizing the graph variable loss function includes: introducing auxiliary variables for each connection between nodes in the convex cluster constrained graph; iteratively performing the following operations until convergence: updating the linear learning models by solving a sparse linear system; and updating the auxiliary variables by solving an equation having the auxiliary variables each be proportional to a vector norm for their respective nodes.

FIG. 1 shows a flow diagram of a multi-task regression method according to an embodiment of the present invention.

The multi-task regression method 100 shown in FIG. 1 includes: a data preprocessing operation (S101); a feature extraction operation (S102); a graph generation operation (S103); a optimization surface generation operation (S104); a global optimal solution obtaining operation (S105); a prediction application operation (S106); a system control operation (S107); and a model update operation (S107). These operations are discussed in more detail below.

A data preprocessing operation (S101) can be the first operation of the multi-task regression method 100. In the data preprocessing operation (S101), input data is preprocessed before being used in subsequent operations. The input data for the multi-task regression method 100 can be a dataset of tasks (e.g., regression tasks). In an embodiment, the input data may be preprocessed to remove missing values, and/or to normalize the data (data normalization).

According to some embodiments, the data preprocessing operation is optional or not implemented.

A feature extraction operation is performed (S102) on the task dataset. In machine learning, feature extraction is a dimensionality reduction process, were an initial set of raw variables is reduced to more manageable groups (features) for processing, while still accurately and completely describing the input dataset. Feature extraction can start from an initial dataset and build derived values (features), which are intended to be informative and non-redundant, as well as to facilitate subsequent learning and prediction steps.

As shown in the embodiment of FIG. 1, the feature extraction operation is performed on the dataset after it has been through the preprocessing operation (S101) (i.e., the input to the feature extraction operation is the preprocessed dataset). In an embodiment, the preprocessed dataset received as the input to the feature extraction operation (S102) is a dataset normalized by a data normalization operation (i.e., a normalized dataset).

In an embodiment, the feature extraction operation (S102) includes performing an auto regressive (AR) operation on the normalized data, for example an AR for time series data. As a person of ordinary skill in the art would recognize, however, other forms of feature extraction, including other regression algorithms, can be performed.

A graph generation operation (S103) is performed where the method generates a graph G. The input to the graph generation operation is the output of the feature extraction operation (S102), e.g., the extracted features for each task of the task dataset. The output graph G of the graph generation operation (S103) includes linear models as nodes and the relationships between them.

Figure 2:
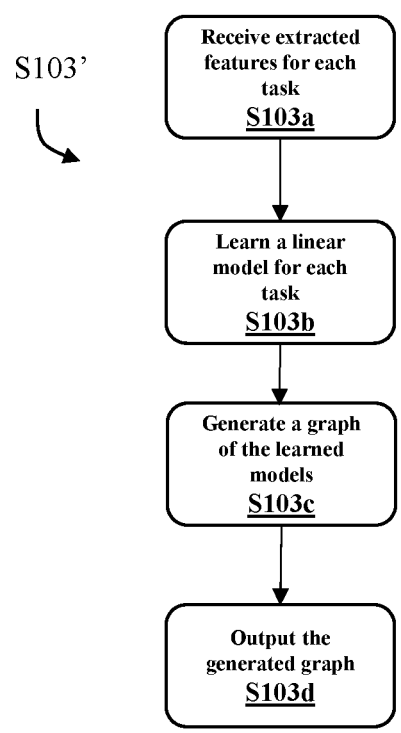
FIG. 2 illustrates a flow diagram of a graph generation operation according to an embodiment of the present invention.

FIG. 2 illustrates an example embodiment of the graph generation operation (S103'). First, the extracted features are received for each task (S103a). From the extracted features for each task, the graph generation operation (S103') learns a linear model for the task (S103b). Each learned linear model can be, for example, represented by a vector of length d in Euclidian space (a weight vector). Then the method generates a graph of the learned linear models (S103c), where each node represents the linear model of a task. The learned graph then can be output to the next operation (S103d).

According to an embodiment, the graph G is a k-nearest neighbor graph on the linear models learned independently for each task (where the models are represented by vectors). There can be and edge between two models (i.e., the learned predictor model for a task) if they are in the k-nearest neighbor of each other in the Euclidean space of the vectors.

As a person of ordinary skill in the art would understand, various linear learning models may be used without diverging from the scope of the present invention. Similarly, embodiments of the present invention can implement various methods of mapping the learned models into a relational vector graph of models.

Returning to FIG. 1, an optimization surface generation operation (S104) is performed on the graph G generated by the graph generation operation (S103). The optimization surface generation method restricts an optimization problem by adding a convex constraint (the L2 norm) on pairs of tasks (i.e., the learned predictor model for the pars of tasks) if there is an edge between them. The L2 norm is a vector norm that calculates the distance of a vector coordinate from an origin of the vector space. As such, it is also known as the Euclidean norm as it is calculated as the Euclidean distance from the origin. The result is a positive distance value. The L2 norm is calculated as the square root of the sum of the squared vector values.

Accordingly, by executing the graph generation operation (S103) together with the optimization surface generation operation (S104), embodiments instantiate a new model for multi-task regression that integrates with convex clustering on the k-nearest neighbor graph of the prediction models of the tasks. Convex clustering solves clustering of data as a regularized reconstruction problem; however, because the target of multi-task learning is the prediction, the convex clustering in the present invention uses the prediction error of the prediction models (instead of the reconstruction error). By using convex clustering, embodiments of the present invention have an advantage over other SoA models in that convex clustering is efficient with linear scalability.

See, e.g., Hocking et al., "Clusterpath: An Algorithm for Clustering using Convex Fusion Penalties", in ICML (2011) (giving an overview of convex clustering) (the entire contents of which is hereby incorporated by reference herein).

Next, the multi-task regression method 100 obtains a global optimal solution (S105) to the convex clustering on the k-nearest neighbor graph of the prediction models. In an embodiment, the multi-task regression method 100 obtains the global optimal solution by minimizing a graph regularized loss function. To obtain the global optimal solution, an embodiment of the present invention iteratively generates a sparse mixed block diagonal and a sparse problem, solves an approximate linear least square problem, and checks solution performance until convergence is reached.

Figure 3:
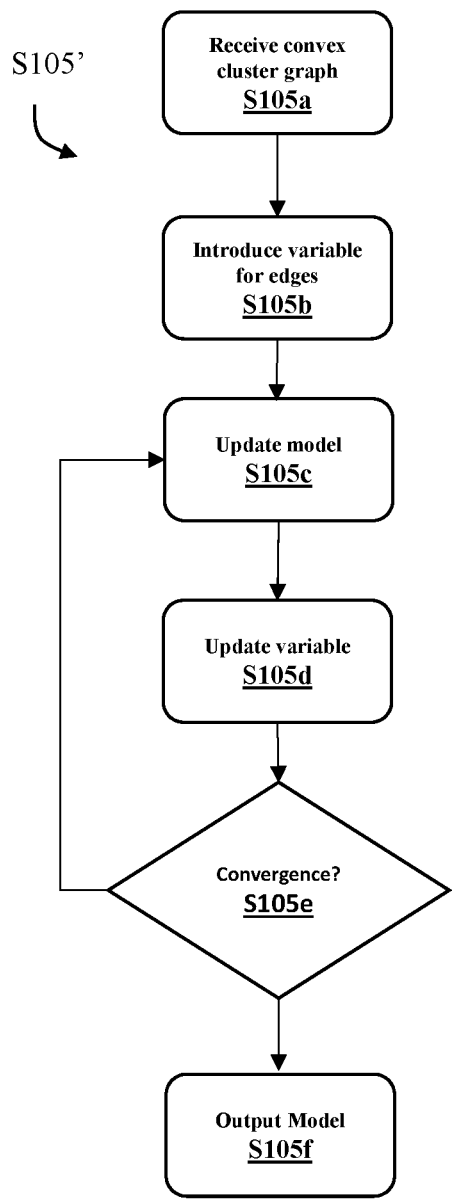
FIG. 3 illustrates a global optimal solution solver operation according to an embodiment of the present invention.

FIG. 3 illustrates an embodiment of the global optimal solution operation (S105'). As shown in FIG. 3, the global optimal solution is obtained by minimizing the graph regularized loss function by:

a. introducing a variable for the edges of the graph (S105a);

b. updating the models by solving a sparse linear system (S105b);

c. updating the variables (S105c);

d. iteratively performing (b) and (c) until convergence (S105e); and e. upon convergence, outputting the optimized predictor model.

The variables introduced for the edges (S105a) are auxiliary variables for each of the connections between nodes in the k-nearest neighbor graph. Effectively, the variables are weights for the L2 norm regularizer.

In an embodiment, each model is a node on the graph represented as a weight vector for a task. The initial weight vector is determined by the model learning operation for the task performed in the graph generation operation (S103)— e.g., in the operation of learning a linear model for each task operation (S103b).

After the global optimal solution to the multi-task regression problem is solved to determine the final prediction model, the prediction model can be used to perform prediction operations on the relevant tasks. As shown in the embodiment of FIG. 1, the prediction operations can include an apply predictor operation (S106) and a control system operation (S107). In the apply predictor operation (S106), the prediction model can be instantiated and input with data and make the predictions of the associated tasks. In the control system operation (S107), the system concerned with the multi-task regression problem can make control decisions based on the predictions made for the tasks.

A model update operation can also be performed (S108), which may include updating the model when new data points come. In an embodiment, performances are measured in the model update operation. The new data points (e.g., new data points obtained by measuring performances) may be sent as inputs to the data preprocessing operation (S101), and the method may continue (e.g., repeat one or more of S102-S108).

Aspects of the present invention are discussed more formally below in relation to an embodiment applied to a time series prediction.

For a time series prediction, an embodiment considers n time series $T_1, \ldots, T_n$ each containing $t_i$ samples. For each task (in this example, the time series), the embodiment considers the last d sample (e.g., AR: Auto Regressive) $X_{ij}=[T_{i,j-1}, \ldots T_{i,j-d}]$. The output of the task becomes $y_i=[y_{i,1}, \ldots y_{i,t_i}]$. The regression problem can be formulated as:

$$\min_{W_i} \|X_i W_i - y_i\|_2^2 + \lambda \|W_i\|_2^2 \quad \text{(EQ. 1)}$$

where $X_i=[X_{i,1}, \ldots, X_{i,t_i}]$ and $y_i=[y_{i,1}, \ldots, y_{i,t_i}]$ are the vector form of the input and the output of the single task $T_i$.

As described above, embodiments of the present invention implement convex clustering to learn accurate predictor models using the prediction error (as compared to using the reconstruction error that is used by SoA convex clustering). For the general case then, the problem can be reformulated as:

$$\min_W \frac{1}{2}\sum_{t=1}^{T}\|W_t^T X_t - y_t\|_2^2 + \frac{\lambda}{2}\sum_{i,j\in G}\|W_i - W_j\|_2 \quad \text{(EQ. 2)}$$

where $W_i$ is the predictor (or regressor or model) for the task $T_i$ and $\lambda$ is a weighting factor that is found iteratively. In an embodiment, $W_i$ represents the weight vector for a task indexed by i.

In an embodiment, the neighboring graph G is computed on the predictors $W_i$ for all tasks. As such, here the index i is a node in the graph G and the index j is a neighboring node in graph G. The graph G is a k-nearest neighbor graph on the predictors learned independently for each task T.

The second term is the regularization term of the predictors, which is the L2 norm. The L2-norm is not squared, which enables greater training performance because a squared norm would increase the penalty of distant predictors. This choice, however, also does not allow for the use of SoA techniques for solving the objective function. Therefore, the methods of embodiments of the present invention perform a new efficient algorithm for solving Equation (2) by iteratively solving a structured linear system.

In particular, Equation (2) can be solved by solving an equivalent problem:

$$\min_{W,L} \frac{1}{2}\sum_{t=1}^{T}\|W_t^T X_t - y_t\|_2^2 + \frac{\lambda}{2}\sum_{i,j\in G}\left(l_{i,j}\|W_i - W_j\|_2^2 + \frac{1}{4}l_{i,j}^{-1}\right) \quad \text{(EQ. 3)}$$

Here, an auxiliary variable $L=\{l_{i,j}\}$ is introduced for each connection between node i and j in graph G, and to form Equation (3) above. According to an embodiment, the auxiliary variables are updated by solving an equation having the auxiliary variables each be proportional to the inverse of a vector norm for their respective nodes.

Equation (3) learns the weights $l_{i,j}$ for the squared L2 norm regularizer $\|W_i - W_j\|_2^2$ as in Graph regularized Multi-Task Learning (SRMTL). See, e.g., Zhou et al., "Clustered Multi-Task Learning Via Alternating Structure Optimization," in Neural Information Processing Systems Conference (NIPS) 24 (2011) (the entire contents of which is hereby incorporated by reference herein).

Equation (3) can be solved by alternately optimizing W and L. According to an embodiment, optimization is achieved by minimizing the loss function regarding W and L alternatively.

When W is fixed, the derivative of Equation (3) is obtained with respect to $l_{i,j}$, which is set to zero, and the updated rule is obtained as shown below in Equation (4) (which is the update rule for $L_{ij}$). By this way L is solved (i.e., optimized).

$$l_{i,j} = \frac{1}{2\|W_i - W_j\|_2} \quad \text{(EQ. 4)}$$

To solve (i.e., optimize) W, L is fixed, which leads to Equation (3) equaling:

$$\min_W \frac{1}{2}\sum_{t=1}^{T}\|W_t^T X_t - y_t\|_2^2 + \frac{\lambda}{2}\sum_{i,j\in G}(l_{i,j}\|W_i - W_j\|_2^2) \quad \text{(EQ. 5)}$$

Here, $X \in \mathbb{R}^{TP \times N}$ and can be defined as a block diagonal matrix, and $Y \in \mathbb{R}^{1 \times N}$ and can be defined as as a row vector:

$$X = \begin{bmatrix} X_1 & & \\ & \ddots & \\ & & X_T \end{bmatrix}$$

$$Y = [y_1, \ldots, y_T]$$

Here, $\mathbb{R}^{TP \times N}$ is a two-dimensional matrix space with multiply (T,P) entries in the first dimension and N entries in the second dimension, and $\mathbb{R}^{1 \times N}$ is a one dimensional matrix space with N entries.

A column vector V can also be defined as:

$$V = \begin{bmatrix} W_1 \\ \vdots \\ W_T \end{bmatrix}$$

By defining these vectors and the bock diagonal matrix, Equation (5) can be rewritten as:

$$\min_v \frac{1}{2}\|V^T X - y\|_2^2 + \frac{\lambda}{2}\sum_{i,j\in G}(l_{i,j}\|V((e_i - e_j)\otimes I_p)\|_2^2) \quad \text{(EQ. 6)}$$

where $e_i \in \mathbb{R}^T$ is an indicator vector with the ith element set to 1 and others set to 0, and $I_P$ is an identity matrix of size P, P being the number of features. Here, $\mathbb{R}^T$ is a vector space with T entries.

By setting the derivative of Equation (6) regarding V to zero, the optimal solution of V can be obtained (and thus each W is optimized) by solving the following linear system:

$$(A+B)V = C \quad \text{(EQ. 7)}$$

where $A = (\lambda \Sigma_{i,j \in G} l_{i,j}(e_i - e_j)(e_i - e_j)^T) \otimes I_p, B = XX^T, C = XY^T$. W will be derived by reshaping V. Here, A is block diagonal and B is very sparse. Also, both A and B are positive semi-definite.

Embodiments apply a combinatory multigrid (CMG) solver to optimize the problem, which scales linearly to the number of tasks n. See, e.g., Ioannis et al., "Combinatorial preconditioners and multilevel solvers for problems in computer vision and image processing," Computer Vision and Image Understanding 115(12), pp. 1638-1646 (2011) (the entire contents of which is hereby incorporated by reference herein). For the sparse linear system, solvers like CG (conjugate gradient) and PCG (preconditional conjugate gradient) may be used. CMG is a type of PCG solver that is special designed for symmetric diagonally dominant linear system. The problem in Equation (7) can be seen as such problem approximately; therefore, CMG works well to solve Equation (7).

Because Equation (3) is biconvex on W and L, alternatively updating Equation (4) and Equation (7) will converge to a local minimum.

The above described multi-task learning algorithm has been named Convex Clustering Multi-Task regression Learning (CCMTL) by the present inventors. As described in detail above, the CCMTL algorithm integrates with convex clustering on the k-nearest neighbor graph of the prediction models. CCMTL efficiently solves the underlying convex problem with the optimization method just described. CCMTL is accurate, efficient to train, and empirically scales linearly. As evidenced below, CCMTL outperforms SoA multi-task learning algorithms in terms of prediction accuracy as well as computational efficiency. For example, on a real-world dataset with 28,812 tasks, CCMTL required only around 30 seconds to train on a single thread, while some SoA methods needed up to hours or even days.

An embodiment of the CCMTL algorithm is summarized below in Algorithm 1. First, it initializes the weight vector $W_t$ by performing linear regression on each task t separately. Then, it constructs the k-nearest neighbor graph G on W based on the Euclidean distance. Finally, the optimization problem is solved by iteratively updating L and W until convergence.

| Algorithm 1: CCMTL |
| --- |
| Input: $\{X_t, Y_t\}$ for t = {1,2, ..., T}, $\lambda$ |
| Output: W = $\{W_1, ... W_T\}$ |
| 1   for t ← 1 to T do |
| 2   │ Solve $W_t$ by Linear Regression on $\{X_t, Y_t\}$ |
| 3   end |
| 4   Construct k-nearest neighbor graph G on W; |
| 5   while not converge do |
| 6   │ Update L using Eq. (3); |
| 7   │ Update W by solving Eq. (6) using CMG; |
| 8   end |
| 9   return W; |

In the following, example embodiments are described, including in applications of transportation, retail demand estimation for multiple stores, prediction of stock market prices, and drug effects prediction in medicine.

Transportation: In an application of an embodiment, a set of routes can be connecting different parts of a city. Each route $R_i$ consists of $n_i$ stops. The set $P_{ij}$ can be the set of realizations of the route $R_i$, i.e., the set of actually travelled routes. Depending on the data collected from an Automatic Passenger Counting (APC) and Automatic Vehicle Location (AVL) systems, the number of boarding and alighting travelers can be collected at each bus stop, besides the time of the vehicle arrival and departure. With embodiments of the present invention, the following problems, for example, can be formulated and solved:

Demand prediction at a given location/stop: For this problem, the task can be formulated at the level of location/stop, and an instance of a task would be each realization of each trip that passes through that stop. The target of each task is the prediction of the number of passengers that is willing to board at this stop. The set of all available stops formulates all tasks that might share some properties (spatial closeness) and causality affects (as in the case of consecutive stops).

Travel time prediction: Similar to the previous problem, the target prediction of the task is the time a trip requires to reach a given stop, given the features of the trip, route, and time.

Demand prediction at the origin-destination level: In the private transportation sector that is not restricted to pre-defined routes (such as taxis and car sharing), the origin-destination matrix can be reformulated in order to be used in the setting of embodiments. To this end, each origin-destination pair is considered as a task, which leads to quadratic number of tasks, in terms of the number of regions. This formulation can be best handled by the method of an embodiment of the present invention because the clustering step reduces the number of tasks and exploits their correlations.

For the three aforementioned example prediction problems, defined in scope of intelligent transportation, the method of embodiments of the present invention provides a better predictive performance and can scale better than the state of the art methods. The method of embodiments achieves this by finding automatically the balance between learning each task (trip) separately and learning all tasks (trips) as a single problem. The method of embodiments finds the right grouping of the tasks (trips), then applies the learning on the found group, while respecting the similarities between similar groups (of trips). In addition, the method of embodiments is efficient to train even for large number of tasks; therefore, the model can be updated in real time.

Retail demand estimation for multiple stores: In the retail market, shop owners aim at maximizing their profit by wisely choosing the set of products offered by their stores. By observing the sales of each product at each store, it can easily be seen that the sales of one product affects the sales of others, and the sales of some shops are affected, sometimes, and correlated, other times, with the sales in similar shops (i.e., spatial similarity, and type similarity).

In an embodiment, the sales of products are predicted by formulating the sales of each product at each store as a time series (task). Therefore, the number of tasks would be in the order of the number of shops by the number of products. With this formulation, the retail demand prediction can be solved efficiently with the approach of embodiments of the present invention because the detection of similarities between tasks (using neighbor graph) helps in collapsing the number of tasks, while still respecting their correlation.

One advantage of applying the approach of embodiments of the present invention to the retail problems, compared to other approaches, is that the approach of embodiments finds the right grouping of (product, store) pairs and then solves the optimization problem. In this way, the approach of embodiments of the present invention achieves a better predictive performance efficiently because it exploits the correlations in the retail market between the different products and the different stores. In addition, the method of embodiments is efficient to train even for large number of tasks; therefore, the model can be updated whenever there are new data points collected.

Prediction of stock market prices: In a formulation similar to the retail demand prediction, the demand and offer of stocks in the market could be modelled into a single task, where the purchases of each share are represented as a task. Thereafter, the price development of all shares can be formulated as a multitask problem.

Here, one advantage of applying the method of embodiments is that shares that tend to have similar temporal trends (increasing or decreasing) are grouped into similar entities (as a result of clustering), and, hence, exploiting the correlation to improve the training on more examples, task-wise, without declining the generalization performance.

Drug effects prediction in medicine: The methods of embodiments can also be used for drug effects prediction. For a given disease, there are more than 20,000 possible small molecules, predicting the effect for each small molecule can be regarded as a regression task. Therefore, predicting the effects for all the drugs can be formulated as a multitask problem. Further, if the drug combination is considered, the number of potential drug pairs or triplets can be huge. Therefore, the methods of embodiments are efficient to handle that case.

The CCMTL method of embodiments of the present invention has been experimentally compared with several SoA methods. As baselines, the CCMTL method is compared with single-task learning (STL)—which learns a single model by pooling together the data from all the tasks, and independent task learning (ITL)—which learns each task independently. CCMTL has been further compared to three multi-task feature learning based methods: Joint Feature Learning (L21) (see Argyriou et al., "Multi-task feature learning," in NIPS, pp. 41-48 (2007) (the entire contents of which is hereby incorporated by reference herein)), Trace-norm Regularized Learning (Trace) (see Ji and Ye, "An accelerated gradient method for trace norm minimization," in ICML, pp. 457-464 (2009) (the entire contents of which is hereby incorporated by reference herein)), and Robust Multi-task Learning (RMTL) (Chen et al., "Integrating low-rank and group sparse structures for robust multi-task learning," in KDD, pp. 42-50 (2011) (the entire contents of which is hereby incorporated by reference herein)). CCMTL has also been compared to two other clustering based methods: CMTL (see Jacob et al., "Clustered multi-task learning: A Convex Formulation," NIPS, pp. 745-752 (2009) (the entire contents of which is hereby incorporated by reference herein)), and FusedMTL (see Zhou et al., "Modeling disease progression via fused sparse group lasso," in KDD, pp. 1095-1103 (2012) (the entire contents of which is hereby incorporated by reference herein)). Finally, CCMTL has been compared to two decomposition based Multi-task Learning models: BiFactorMTL and TriFactorMTL (see Murugesan et al., "Co-clustering for multitask learning," ICML (2017) (the entire contents of which is hereby incorporated by reference herein)).

All methods were implemented in Matlab. The implementation of L21, Trace, RMTL and FusedMTL were from the Malsar package. See Zhou et al., "Malsar: Multi-task learning via structural regularization," Arizona State University 21 (2011) (the entire contents of which are hereby incorporated by reference herein). CMTL, BiFactorMTL, and TriFactorMTL were obtained from their authors' personal websites. CCMTL, STL, ITL, L21, Trace and FusedMTL each need one regularization parameter, which was selected from $[10^{-5}, 10^5]$. RMTL, CMTL, BiFactorMTL and TriFactorMTL each need two regularization parameters, which were selected from $[10^{-3}, 10^3]$. CMTL and BiFactorMTL further needs one hyperparameter and TriFactor further needs two hyperparameters for the number of clusters, which were chosen from [2, 3, 5, 10, 20, 30, 50]. All hyperparameters were selected by internal 5-fold cross validation on the training data.

TABLE 1

Summary statistic of the datasets

| Name | Samples | Features | Num Tasks |
| --- | --- | --- | --- |
| Syn | 3000 | 15 | 30 |
| School | 15362 | 28 | 139 |
| Sales | 34062 | 5 | 811 |
| Ta-Feng | 2619320 | 5 | 23812 |
| Alighting | 33945 | 5 | 1926 |
| Boarding | 33945 | 5 | 1926 |

Synthetic and Real-World datasets were employed. Table 1 (above) shows the statistics about the datasets. Further details are provided below:

Synthetic: Syn dataset consists of three groups of tasks with ten tasks in each group. Fifteen features F were generated from $\mathcal{N}(0,1)$. Tasks in group 1 were constructed from features 1-5 in F and random 10 features. Similarly, Tasks in group 2 and 3 were constructed from features 6-10 and 11-15 in F respectively. One-hundred samples were generated for each task.

Benchmark: School is a benchmark dataset in Multitask regression. See, e.g., Argyriou et al., "Multi-task feature learning," in NIPS, pp. 41-48 (2007) (the entire contents of which are hereby incorporated by reference herein). The School dataset consists of examination scores of 15,362 students from 139 schools in London. Each school is considered as a task, and the aim is to predict the exam scores for all the students. The dataset used is from the Malsar package.

Retail: Sales is a dataset that contains weekly purchased quantities of 811 products over 52 weeks. See Tan et al., "Time series clustering: A superior alternative for market based analysis," Proceedings of the National Academy of Sciences Conference on Advanced Data and Information Engineering, pp. 241-248 (2013) (there entire contents of which are hereby incorporated by reference herein). The dataset was built using the sale quantities of 5 previous weeks for each product to predict the sale for the current week, resulting in 34,062 samples in total. Ta-Feng is another grocery shopping dataset that consists of transactions data of 23,812 products over 4 months. The data was built in a similar manner, and there are 2,619,320 samples in total.

Transportation: Demand prediction is an important aspect for intelligent transportation. For transportation, a dataset was generated by a bus operator in Stockholm. The data was collected from busses directly using Automatic Vehicle Location (AVL) and Automatic passenger Counting (APC) systems. There were two bus lines and two directions for each line, and four routes. Each trip (one realization of a route) was considered as a task, and the target of the instances in this task was to predict the number of passengers taking the bus (boarding) at given bus stop, given the arrival time to the stop and the number of alighting and boarding at the previous two stops. The same dataset was also used to predict the alighting as a target attribute. The two datasets, alighting and boarding, were generated with 33,945 samples each.

The performance of the CCMTL method of the present invention was compared to the ADMM based solver on solving the problem of Equation (2). The ADMM solver was implemented using the SnapVX package from NetworkLasso. See Hallac, et al., "Network lasso: Clustering and optimization in large graphs," KDD, pp. 387-396 (2015) (the entire contents of which is hereby incorporated by reference herein). Both the CCMTL method of the present invention and the ADMM based solver were evaluated on the Syn dataset and the School benchmark dataset. The graph was generated as described in Algorithm 1, and the same graph was used to test two solvers with different $\lambda$. Table 2 and 3 depicts the objective functions and runtime comparison on Syn and School datasets respectively.

TABLE 2

Objective and runtime comparison between the proposed and the ADMM solver on Syn data.

| Syn | $\lambda = 0.01$ | | $\lambda = 0.1$ | | $\lambda = 1$ | | $\lambda = 10$ | | $\lambda = 100$ | |
|---|---|---|---|---|---|---|---|---|---|---|
| | Obj | Time(s) | Obj | Time(s) | Obj | Time(s) | Obj | Time(s) | Obj | Time(s) |
| ADMM | 1314 | 8 | 1329 | 8 | 1474 | 9 | 2320 | 49 | 7055 | 180 |
| CCMTL | 1314 | 0.5 | 1329 | 0.5 | 1472 | 0.5 | 2320 | 0.5 | 6454 | 0.5 |

TABLE 3

Objective and runtime comparison between the proposed and the ADMM solver on School data.

| School | $\lambda = 0.01$ | | $\lambda = 0.1$ | | $\lambda = 1$ | | $\lambda = 10$ | | $\lambda = 100$ | |
|---|---|---|---|---|---|---|---|---|---|---|
| | Obj | Time(s) | Obj | Time(s) | Obj | Time(s) | Obj | Time(s) | Obj | Time(s) |
| ADMM | 664653 | 605 | 665611 | 583 | 674374 | 780 | 726016 | 4446 | 776236 | 5760 |
| CCMTL | 664642 | 0.7 | 665572 | 0.8 | 674229 | 0.9 | 725027 | 1.5 | 764844 | 1.9 |

From Tables 2 and 3 it can be seen that, when $\lambda$s are small, both the CCMTL solver of the present invention and ADMM based solver give close objective function values of Equation (2). However, when $\lambda$s are large, e.g., 100, the CCMTL method of the present invention provides much smaller objective values than ADMM based solver. This is because the convergence of ADMM is related to its hyperparameters, and the present invention only uses the default ones. In addition, it can be seen that ADMM based solver is expensive to train for the rather small tested datasets Syn and School. In the comparison, the CCMTL solver of the present invention is much more efficient than ADMM based one, with only around 1 second of runtime.

In comparison to SoA multi-task learning methods, the prediction accuracy was evaluated using the Root Mean Squared Error (RMSE). All of the experiments were repeated five times for statistical test. The best model and the statistically competitive models (by paired t-test with $\alpha=0.05$) are shown in boldface.

Table 4 depicts the prediction RMSE on Syn dataset with the ratio of training samples ranging from 20% to 40%. In the Syn dataset, tasks are heterogeneous and well partitioned. Thus, STL that trains only single model performs the worst. All the MTL methods outperform the baseline STL and ITL. Among them, the clustering based methods CMTL, BiFactor, TriFactor and CCMTL gave the best predictions. CCMTL and BiFactor outperform all the other methods in all cases.

TABLE 4

Results on Synthetic datasets (RMSE).

|  | 20% | 30% | 40% |
|---|---|---|---|
| STL | 2.905 (0.031) | 2.877 (0.025) | 2.873 (0.036) |
| ITL | 1.732 (0.077) | 1.424 (0.049) | 1.284 (0.024) |
| L21 | 1.702 (0.033) | 1.388 (0.014) | 1.282 (0.011) |
| Trace | 1.302 (0.042) | 1.222 (0.028) | 1.168 (0.023) |
| RMTL | 1.407 (0.028) | 1.295 (0.024) | 1.234 (0.039) |
| CMTL | 1.263 (0.038) | 1.184 (0.007) | 1.152 (0.017) |
| FuseMTL | 2.264 (0.351) | 1.466 (0.025) | 1.297 (0.048) |
| BiFactor | 1.219 (0.025) | 1.150 (0.020) | 1.125 (0.013) |
| TriFactor | 1.331 (0.239) | 1.255 (0.236) | 1.126 (0.010) |
| CCMTL | 1.192 (0.018) | 1.161 (0.018) | 1.136 (0.015) |

Table 5 depicts the results on two retail datasets: Sales and Ta-Feng, where the runtime was recorded in seconds for methods with their most expensive parameterization. The best runtimes for MTL methods are shown in boldface. Again, on Sales and Ta-Feng tasks are rather homogenous, where STL performs competitive and outperform many MTL methods. CCMTL outperforms STL as well as all the other methods on Sales datasets. In addition, it only took 1.8 seconds to train CCMTL's most expensive hyperparameter, while it took dozens (or even hundreds of seconds) for other MTL methods. Similar results can be observed on Ta-Feng dataset, where CCMTL and FuseMTL are the best methods regarding RMSE. However, it only took CCMTL 39.7 seconds, but 9,826 seconds for FuseMTL. The runtime for CMTL, BiFactor and TriFactor are even more than 24 hours. Also, because CMTL and BiFactors have three hyperparameters and TriFactor has four hyperparameters, the hyperparameters selection is even more expensive for them.

TABLE 5

Results on Retail datasets

|  | Sales | | Ta-Feng | |
|---|---|---|---|---|
| Syn | RMSE | Time(s) | RMSE | Time(s) |
| STL | 2.861 (0.02) | 0.1 | 0.791 (0.01) | 0.2 |
| ITL | 3.115 (0.02) | 0.1 | 0.818 (0.01) | 0.4 |
| L21 | 3.301 (0.01) | 11.8 | 0.863 (0.01) | 5942 |
| Trace | 3.285 (0.21) | 10.4 | 0.863 (0.01) | 7041 |
| RMTL | 3.111 (0.01) | 3.4 | 0.808 (0.01) | 1396 |
| CMTL | 3.088 (0.01) | 43.4 | — | >24 h |
| FuseMTL | 2.898 (0.01) | 4.3 | 0.764 (0.01) | 9826 |
| BiFactor | 2.882 (0.01) | 55.7 | — | >24 h |
| TriFactor | 2.857 (0.04) | 499.1 | — | >24 h |
| CCMTL | 2.793 (0.01) | 1.8 | 0.767 (0.01) | 35.3 |

Table 6 shows the results on the School dataset with the ratio of training samples ranging from 20% to 40%. ITL performs the worst on School because of the limited number of training samples for each task. STL outperforms ITL, the reason possibly being that the tasks are rather homogenous in the School dataset. Surprisingly, the simple STL outperforms many MTL methods, e.g. L21, Trace, RMTL and FusedMTL. MTFactor and TriFactor improve STL only when the training ratios are larger. CCMTL is the best method on the School datasets, and outperforms all the other methods except CMTL on the scenario with 20% training samples, where competitive results are observed.

TABLE 6

Results on School datasets (RMSE)

|  | 20% | 30% | 40% |
|---|---|---|---|
| STL | 10.245 (0.026) | 10.219 (0.034) | 10.241 (0.068) |
| ITL | 11.427 (0.149) | 10.925 (0.085) | 10.683 (0.045) |
| L21 | 11.175 (0.079) | 11.804 (0.134) | 11.442 (0.137) |
| Trace | 11.117 (0.054) | 11.877 (0.542) | 11.655 (0.058) |
| RMTL | 11.095 (0.066) | 10.764 (0.068) | 10.544 (0.061) |
| CMTL | 10.219 (0.056) | 10.109 (0.069) | 10.116 (0.053) |
| FuseMTL | 10.372 (0.108) | 10.407 (0.269) | 10.217 (0.085) |
| MTFactor | 10.445 (0.135) | 10.201 (0.067) | 10.116 (0.051) |
| TriFactor | 10.551 (0.080) | 10.224 (0.070) | 10.129 (0.020) |
| CCMTL | 10.170 (0.029) | 10.036 (0.046) | 9.972 (0.021) |

Table 7 depicts the results on the Transportation datasets, using two different target attributes (alighting and boarding). The runtime is presented for the best-found parameterization, and the best runtime achieved by the MTL methods are shown in boldface. The results on this dataset are interesting, especially because both baselines are not competitive as in the previous datasets. This could, safely, lead to the conclusion that the tasks belong to latent groups, where tasks are homogenous intra-group, and heterogeneous inter-groups. All MTL methods (except FuseMTL) outperform at least one of the baselines (STL and ITL) on both datasets. The CCMTL approach of the present invention, reaches an appropriate balance between task independence (ITL) and competitive correlation (STL), as confirmed by the results. The CCMTL approach of the present invention achieves, statistically, the lowest RMSE against the baselines and all the other MTL methods (except SRMTL), and it is at least 40% faster than the fastest MTL method (RMTL).

TABLE 7

Results on Transportation datasets

|  | Alighting | | Boarding | |
|---|---|---|---|---|
| Syn | RMSE | Time(s) | RMSE | Time(s) |
| STL | 3.073 (0.02) | 0.1 | 3.236 (0.03) | 0.1 |
| ITL | 2.894 (0.02) | 0.1 | 3.002 (0.03) | 0.1 |
| L21 | 2.865 (0.04) | 14.6 | 2.983 (0.03) | 16.7 |
| Trace | 2.835 (0.01) | 19.1 | 2.997 (0.05) | 17.5 |
| RMTL | 2.985 (0.03) | 6.7 | 3.156 (0.04) | 7.1 |
| CMTL | 2.970 (0.02) | 82.6. | 3.105 (0.03) | 91.8 |
| FuseMTL | 3.080 (0.02) | 11.1 | 3.243 (0.03) | 11.3 |
| BiFactor | 3.010 (0.02) | 152.1. | 3.133 (0.03) | 99.7 |
| TriFactor | 2.913 (0.02) | 292.3 | 3.014 (0.03) | 359.1 |
| CCMTL | 2.795 (0.02) | 4.8 | 2.928 (0.03) | 4.1 |

Figure 4:
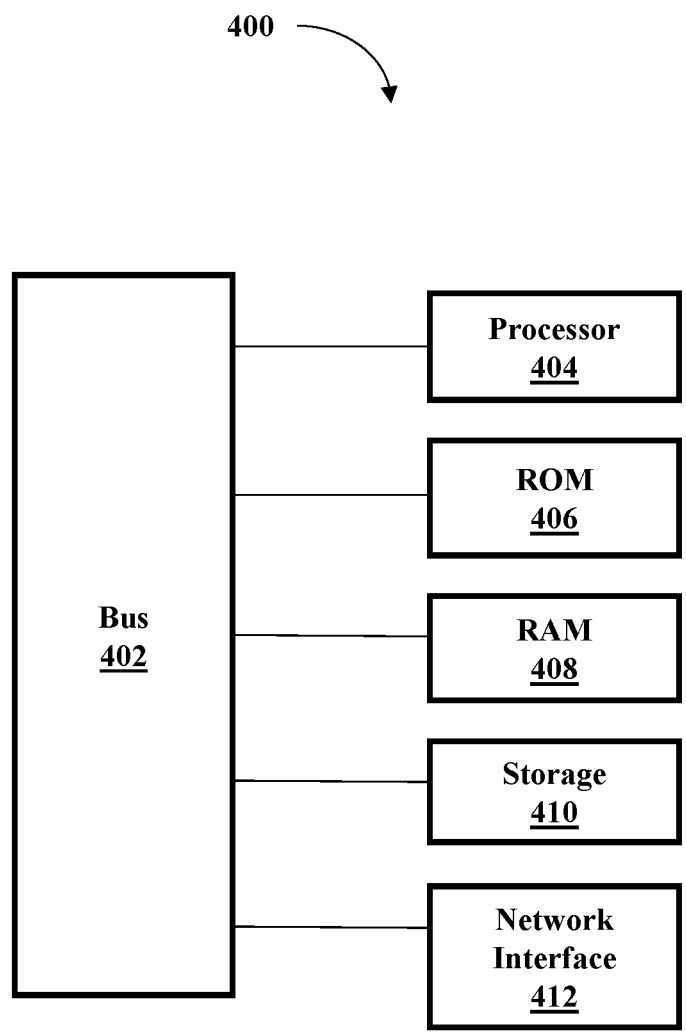
FIG. 4 is a block diagram of a processing system according to an embodiment of the present invention.

FIG. 4 is a block diagram of a processing system according to an embodiment. The processing system embodies a specialized computer system specifically configured to implement the method and system for scalable multi-task learning with convex clustering according to the present invention. The processing system 400 therefore executes the algorithms, protocols, systems and methods described above. The processing system 400 includes a processor 404, such as a central processing unit (CPU) of a computing device or a distributed processor system. The processor 404 executes processor executable instructions to instantiate and employ embodiments of the system for performing the functions and methods described above. In embodiments, the processor executable instructions are locally stored or remotely stored and accessed from a non-transitory computer readable medium, such as storage 410, which may be a hard drive, cloud storage, flash drive, etc. Read Only Memory (ROM) 406 includes processor executable instructions for initializing the processor 404, while the random-access memory (RAM) 408 is the main memory for loading and processing instructions executed by the processor 404. The network interface 412 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for scalable multi-task learning with convex clustering, the method comprising:
    extracting features from a dataset of a plurality of tasks;
    generating a graph from the extracted features, nodes of the graph representing linear learning models, each of the linear learning models being for one of the tasks;
    constraining the graph using convex clustering to generate a convex cluster constrained graph; and
    obtaining a global solution by minimizing a graph variable loss function, the minimizing the graph variable loss function comprising:
        introducing auxiliary variables for each connection between nodes in the convex cluster constrained graph;
        iteratively performing the following operations until convergence:
            updating the linear learning models by solving a sparse linear system; and
            updating the auxiliary variables by solving an equation having the auxiliary variables each be proportional a vector norm for their respective nodes.

2. The method of claim 1, wherein the graph variable loss function with introduced auxiliary variables is:

$$\min_{W,L} \frac{1}{2}\sum_{t=1}^{T} \|W_t^T X_t - y_t\|_2^2 + \frac{\lambda}{2}\sum_{i,j \in G}\left(l_{i,j}\|W_i - W_j\|_2^2 + \frac{1}{4}l_{i,j}^{-1}\right),$$

wherein $W_i$ is a linear learning model of the linear learning models for task $T_i$ of the tasks, $\lambda$ is a weighting factor, G is the convex cluster constrained graph, $X_i$ is a vector of an input of the task $T_i$, $y_i$ is a vector of an input for the task $T_i$, $l_{i,j}$ is an auxiliary variable of the auxiliary variables for one of the connections between the nodes, $\|W_i - W_j\|_2$ is the vector norm, which is an L2 norm, for the one of the connections between the nodes, L is a set containing the auxiliary variables, and W is a set of the linear learning models.

3. The method of claim 2,
wherein the sparse linear system is:

$(A+B)V=C$, wherein $A = (\lambda \Sigma_{i,j \in G} l_{i,j}(e_i - e_j)(e_i - e_j)^T) \otimes I_p$, $B = XX^T$, $C = XY^T$,
wherein $e_i \in \mathbb{R}$ is an indicator vector with an ith element set to 1 and other elements set to 0, and $I_p$ is an identity matrix of size P,
wherein $\otimes$ indicates an operator for a Kronecker product,
wherein X is a block diagonal matrix containing the vector of the input for each of the tasks, Y is a row vector containing the vector the input for each of the tasks, and V is a column vector containing the linear learning models of the tasks, and
wherein the solving of the sparse linear system comprises executing a combinatorial multigrid algorithm.

4. The method of claim 2, wherein updating the auxiliary variables by solving the following equation for each of the auxiliary variables:

$$l_{i,j} = \frac{1}{2\|W_i - W_j\|_2}.$$

5. The method of claim 1, wherein obtaining the global solution generates a multi-task predictor.

6. The method of claim 5, the method comprising using the multi-task predictor to make a prediction, and executing a control operation on a system associated with the tasks based on the prediction.

7. The method of claim 5 further comprising updating the multi-task predictor based on receiving new data points.

8. The method of claim 1 further comprising preprocessing the task dataset before extracting the features.

9. The method of claim 8, wherein the data preprocessing comprises removing missing values and/or normalizing the task data.

10. The method of claim 1, wherein extracting the features from the task dataset comprises performing an auto regressive function on the task dataset.

11. The method of claim 1, wherein the generating the graph from the extracted features comprises learning the linear learning model for each of the tasks from the extracted features that correspond to the respective task.

12. The method of claim 1, wherein the learned linear model for each task is represented by a weight vector.

13. The method of claim 1, wherein the graph is a k-nearest neighbor graph in Euclidean space.

14. A multi-task learning system comprising a processor coupled to a non-transitory storage memory containing instructions, which when executed by the processor, cause the multi-task learning system to:
    extract features from a dataset of a plurality of tasks;
    generate a graph from the extracted features, nodes of the graph representing linear learning models, each of the linear learning models being for one of the tasks;

constrain the graph using convex clustering to generate a convex cluster constrained graph; and
obtain a global solution by minimizing a graph variable loss function, the minimizing the graph variable loss function comprising:
   introducing auxiliary variables for each connection between nodes in the convex cluster constrained graph;
   iteratively performing the following operations until convergence:
      updating the linear learning models by solving a sparse linear system; and
      updating the auxiliary variables by solving an equation having the auxiliary variables each be proportional to a vector norm for their respective nodes.

15. A non-transitory processor-readable storage medium storing instructions that upon execution cause a multi-task learning system to:
extract features from a dataset of a plurality of tasks;
generate a graph from the extracted features, nodes of the graph representing linear learning models, each of the linear learning models being for one of the tasks;
constrain the graph using convex clustering to generate a convex cluster constrained graph; and
obtain a global solution by minimizing a graph variable loss function, the minimizing the graph variable loss function comprising:
   introducing auxiliary variables for each connection between nodes in the convex cluster constrained graph;
   iteratively performing the following operations until convergence:
      updating the linear learning models by solving a sparse linear system; and
      updating the auxiliary variables by solving an equation having the auxiliary variables each be proportional to a vector norm for their respective nodes.

\* \* \* \* \*